United States Patent [19]

Angell

[11] Patent Number: 4,958,633
[45] Date of Patent: Sep. 25, 1990

[54] VALVE FOR RESPIRATOR

[75] Inventor: Cyril N. E. Angell, Trowbridge, United Kingdom

[73] Assignee: Avon Industrial Polymers Limited, Melksham, England

[21] Appl. No.: 349,923

[22] Filed: May 9, 1989

Related U.S. Application Data

[63] Continuation of Ser. No. 795,916, Nov. 7, 1985, abandoned.

[30] Foreign Application Priority Data

Nov. 13, 1984 [GB] United Kingdom ................ 8428640

[51] Int. Cl.$^5$ .............................................. A62B 7/00
[52] U.S. Cl. .......................... 128/201.19; 128/205.24; 128/207.12
[58] Field of Search ...................... 128/201.19, 201.28, 128/205.24, 206.18, 207.12, 207.16, 206.24

[56] References Cited

U.S. PATENT DOCUMENTS

| | | | |
|---|---|---|---|
| 3,035,574 | 5/1962 | Lytle et al. | 128/201.19 |
| 3,232,304 | 2/1966 | Koester . | |
| 3,342,200 | 9/1967 | Wilcox | 128/207.12 |
| 3,602,219 | 8/1971 | Warncke | 128/201.19 |
| 4,414,973 | 11/1983 | Matheson et al. | 128/206.24 |
| 4,539,983 | 9/1985 | Angell | 128/201.19 |

FOREIGN PATENT DOCUMENTS

| | | |
|---|---|---|
| 1011732 | 7/1957 | Fed. Rep. of Germany . |
| 1580403 | 9/1969 | France . |
| 870011 | 6/1961 | United Kingdom . |
| 900875 | 7/1962 | United Kingdom . |

*Primary Examiner*—Randall L. Green
*Assistant Examiner*—K. M. Reichle
*Attorney, Agent, or Firm*—William R. Hinds

[57] ABSTRACT

A valve for a respirator has an elastomeric valve member (18) of generally dished form with an annular channel (25) around its central portion (24). The member (18) is secured at its center by a shouldered conical stem (19) and seals round its periphery (23). The channel (25) allows a sudden collapse of resistance to opening force in the direction of the arrow A above a predetermined amount, but a positive biasing action towards closure. The edges of the channel (26,27) are slightly axially displaced from one another. Both inlet and outlet valves of a respirator may be equipped with such a valve member.

15 Claims, 3 Drawing Sheets

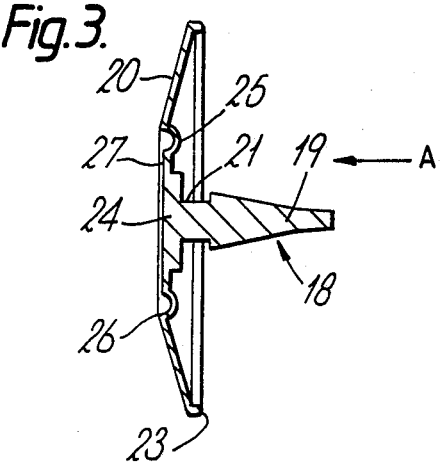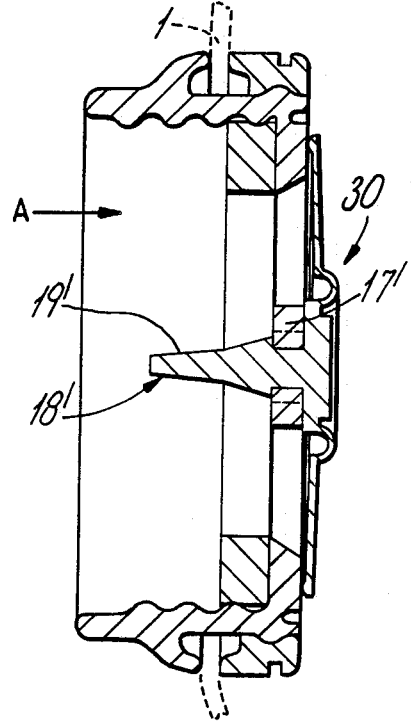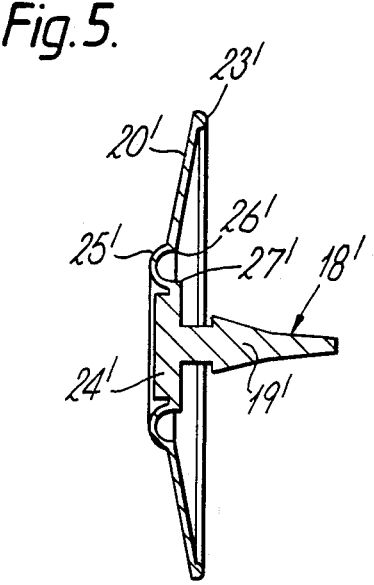

VALVE FOR RESPIRATOR

This is a continuation of application Ser. No. 795,916, filed Nov. 7, 1985, now abandoned.

BACKGROUND OF THE INVENTION

The present invention relates to a valve for use in a respirator. It is useable as an inlet or as an outlet valve. An inlet valve is placed between the user's face and the purifying canister; the outlet valve permits exhaustion of air from the respirator and is particularly though not exclusively intended for use in a speech transmitter of the general type seen in our prior European Patent Application No. 83.304598.2 (Publication No. 101292).

The valve member in that prior disclosure was a resilient, essentially flat, plate which was, however, provided with corrugations to increase its flexibility.

SUMMARY OF THE INVENTION

In the specific context of the protection of the wearer against extremely hostile conditions, it has been found desirable to provide a valve member of a more positively self biassing action whereby leakage rates when the valve is closed may be reduced to negligible proportions. It would of course be very easy to do this by strong biassing of the valve by such conventional means as springs. However another requirement of respirators is that if the user should undergo exertion, there should be low resistance to air flow through either the inlet or outlet valves. The rate of flow attained by a user undergoing violent exercise may reach 20 liters a second. The object of the present construction is therefore to provide a valve which has extremely high reliability in the closed condition and yet does not offer a straight line increase in resistance to flow when it is open under the influence of gas passing in the permitted direction.

This is achieved by a valve member which is constructed of resilient material in a generally dished form being anchored to a seating member at its centre portion and being adapted to seal on a peripheral part of the seating member around its own periphery, the relationship of the centre and peripheral parts of the seating member being such that the dished formation of the resilient valve member biasses its periphery into the sealing contact; but the dish being interrupted by an annular channel formation in its central portion and surrounding the anchoring part of the valve member. This structure is one which as already stated causes biassing of the valve member towards the closed position when in the appropriate condition; however, upon pressure reduction from one side of the member to cause flow of gas in the permitted direction the resistance of the valve member is not linear. Rather, once a certain initial resistance is overcome the annular channel formation collapses and permits flexion of the valve member comparatively freely under the influence of gas pressure. Immediately gas pressure ceases, the inherent resilience of the material of the valve member and particularly of the annular channel formation causes a reversion to the dished, valve-closing, position.

Preferably the channel is a sole channel in the dish and is of arcuate section, more preferably being of substantially semi-toroidal section; its base may be presented in use to the downstream side, that is to say the lower-pressure side of the valve member, or to the upstream, higher-pressure side.

Furthermore the valve member is able to be made as a single one-piece integer of elastomeric material.

The invention includes a respirator fitted with such a valve member at its inlet and/or outlet valve.

BRIEF DESCRIPTION OF THE DRAWINGS

Particular embodiments of the invention will now be described with reference to the accompanying drawings wherein;

FIG. 3 is a diametrical section through a first embodiment of a valve member also seen in FIG. 2;

FIG. 4 is a diametrical section through an inlet valve assembly of the respirator; and FIG. 5 is a diametrical section through the valve member for the inlet valve assembly.

DETAILED DESCRIPTION OF THE PREFERRED EMBODIMENT

Figure 1:
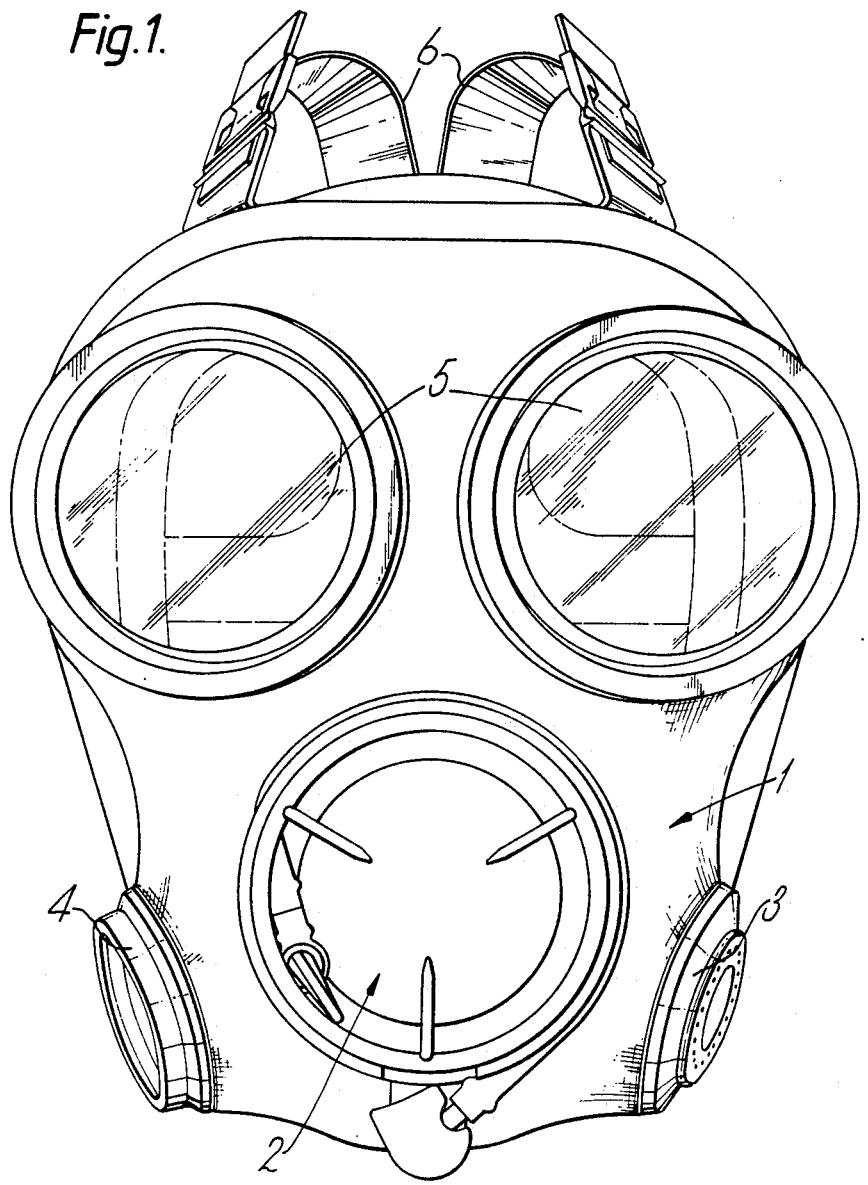
FIG. 1 shows a front view of a respirator.

FIG. 1 shows the front view of a facepiece 1 of a respirator on the median plane of which is mounted a speech transmitter 2 and symmetrically to each side of which are provided apertures 3, 4 having mountings which are respectively for a secondary speech outlet such as a microphone and for an air purifying canister. The facepiece also has lenses 5 mounted in it and it is secured to the head of the user by a strap harness 6.

The present invention is concerned with the valving arrangements which permit ingress and egress of air to and from the plenum chamber formed between the face of the wearer and the facepiece 1, when the respirator is fitted on the wearer's head.

Figure 2:
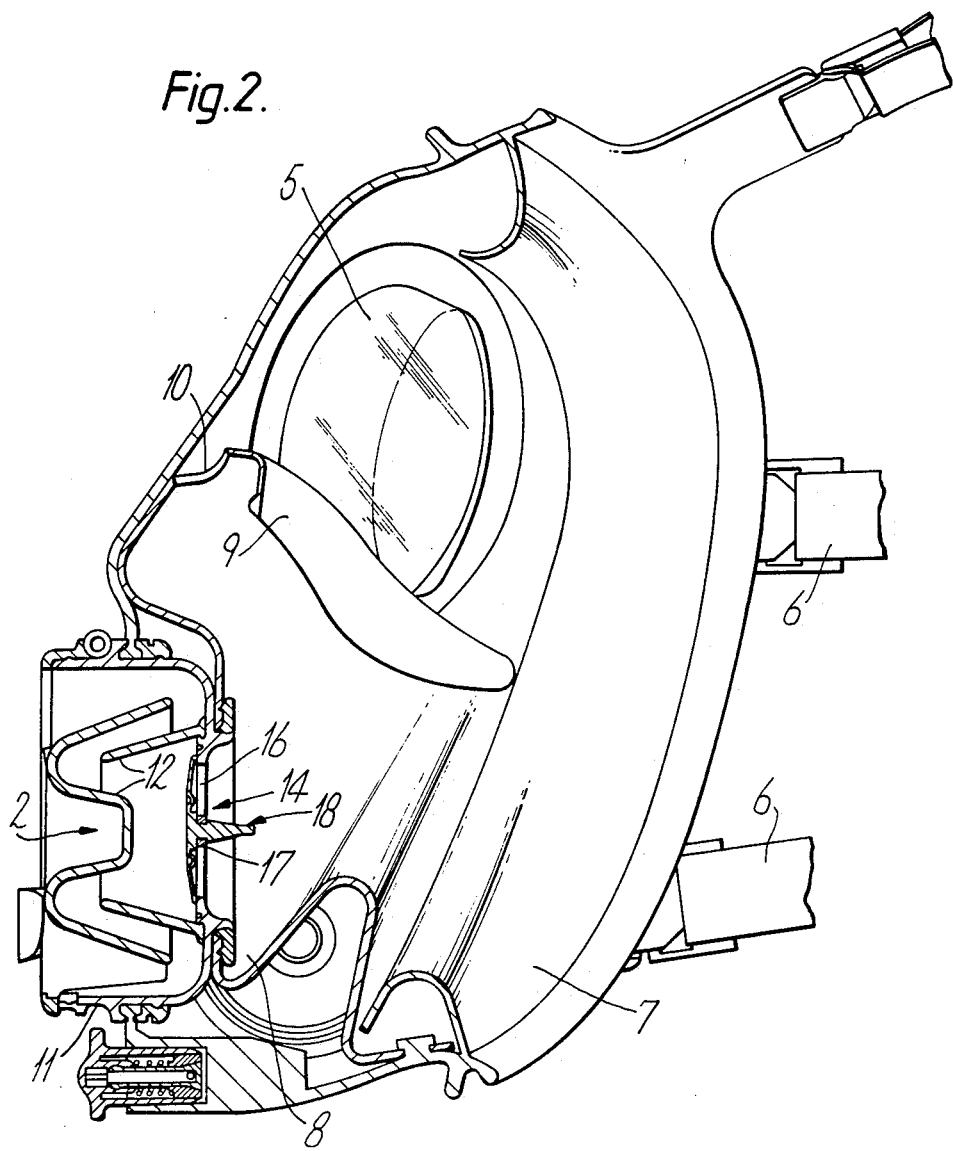
FIG. 2 is a side view of a central section of the respirator of FIG. 1.

As seen in FIG. 2 sealing between the wearer's face and the facepiece is assured by a soft rubber flap 7 and air guidance is afforded by an airguide 8 lying between the facepiece and the user's face which guides and distributes air between whichever of the inlets 3 and 4 is used for the purifying canister, the lenses 5 of the facepiece and the user's nose and mouth. The turned over flap 9 at the head of the airguide seals it against the user's cheek below the level of his eye leaving an air passage 10 for generally downward movement of air to his nose and mouth.

The airguide may preferably be as disclosed in our earlier European Application No. 83.300911.1 (Publication No. 0087909). On the front of the facepiece is mounted a speech transmitter 2 having mounted within a projecting casing 11, interfingering frusto conical elements 12 as are more particularly disclosed in our earlier European Application Publication No. 101292.

The present invention is concerned with the valving arrangement for allowing air to pass to this speech transmitter structure 2, and, separately, for allowing ingress of purified air into the face mask from the purifying canister.

Looking first at the outlet valving arrangement behind the speech transmitter, which is given the general reference 14, a planar seating surround has spiders 16 leading to a central hub 17 in which there is an aperture. A valve member 18 is mounted in this aperture by having pulled through it a double tapered truncated cone stem 19 best seen in FIG. 3. The stem terminates adjacent the centre of a dished valve plate in an annular groove 21 which is to be received in the aperture of the hub 17 so that the valve member is trapped therein by shoulders on the wider end of the conical stem 19. The dished plate 20 has a thickened bead 23 and in its normal relaxed condition is of a symmetrical umbrella or mushroom dished shape. Surrounding its thickened and comparatively rigid central part 24 which is where the valve member is anchored to the hub 17, there is a single annular arcuate section channel 25, the base of which is directed towards the plane containing the bead 23 of the dish when in its relaxed condition. As can again be best seen from FIG. 3 the outer peripheral crest 26 of the channel lies slightly above the level of the inner peripheral crest 27, which is planar with the flat surface of the central part 24.

The operation of the valve member is this. When mounted in the assembly 14 the bead 23 is in sealing contact with the seating surface, biassed into that contact by the nature of the elastomeric material which makes up the valve member and by its dished conformation. When the user speaks or expels air pressure on the concave face of the dished part causes the bead 23 to move away from the seating surface at one or more regions. If the expulsion of breath is normal or simply associated with speech there is a very small rate of flow past the valve. If however the user has been undergoing exertion there will be a much higher rate of flow. In these circumstances the one or more parts of the bead of the member are pushed so far away from the seating surface that the dished part of the valve member loses its response conformation and flexes. Its rate of increase of resistance to air flow ceases to be linear and there is a collapse in that resistance. However, immediately air flow ceases, the natural resilience of the material which may be called its elastic memory reasserts the dished conformation and the bead 23 is urged in an extremely leakproof manner against the seating surface.

FIG. 4 shows how what is essentially the same structure may be used with appropriate modification for an inlet valve arrangement 30 which lies between an air purifying canister and the face of the user. As before, a seating surface is provided and a hub 17' offers an aperture for the reception of a stem 19' of a valve member 18' which is this time an inlet valve member. This is best seen in FIG. 5. As before a dished conformation 20' has a bead 23' but here, the central part 24' is surrounded by a slightly deeper arcuate section (approximately semi-circular section) channel 25', the base of which is directed this time away from the plane containing the bead 23'. It will be noted that in the inlet valve arrangement the outer peripheral crest 26' of the channel lies in a plane more remote from the plane of the bead 23' than does the inner peripheral crest 27'.

The action of this valve member is substantially identical in that initial inhalation resulting in pressure reduction on the convex face of the dish member results initially in a slight lifting off of the bead 23' from its seating surface. But if a high rate of demand is met, air flow resistance only increases less than linearly.

This is because at a certain rate of air flows past the valve the dished and channel conformation of the valve collapses and the valve "flips" open. The rate of increase of resistance to air flow versus rate of air flow is no longer linear and substantially increases only by virtue of the structure of the valve aperture and canister rather than due to any resistance contributed by the valve member itself. However, when such high rates of demand cease, the valve immediately recovers and once more forms an extremely secure seal against leakage.

The direction of permitted air flow is indicated by arrows A in FIGS. 3 and 4 respectively. These Figures represent one possible combination of valve assemblies in a respirator; the valve of FIGS. 2 and 3 as an outlet valve with its channel 25 opening to the outside of the respirator (its base or convexity facing into the permitted direction of air flow) and that of FIGS. 4 and 5 as an inlet valve with its channel 25' opening to the outside of the respirator.

However, it is found that sometimes this arrangement, though perfectly safe, can in some circumstances produce some resonances in speech; and an arrangement now preferred is one where the valve member of FIG. 3 is used also in the inlet valve assembly, i.e. is substituted for the valve member 18' of FIG. 4, and is used with its channel 25 opening to the inside of the respirator and the base or convexity of the channel towards the outside thereof. The operation of this arrangement in regard to air flow is just as previously described.

I claim:

1. A respirator comprising a facepiece having a gas inlet and a gas outlet, an outlet valve assembly for permitting flow of gas outwardly only at the gas outlet, an inlet valve assembly for permitting flow of gas inwardly only at the gas inlet, at least the outlet valve assembly comprising a valve member and a valve seat, said valve member comprising a disc of elastomeric material, the disc having a periphery and a central portion, securing means at the central portion of the disc for securing that portion stationary in the valve assembly, part of the periphery of the disc being for sealing contact against the seat of the valve assembly to prohibit gas passage in the non-permitted direction, an annular channel in the disc between the central portion and the periphery thereof, said disc being continuously conical between said channel and said periphery whereby the part on the periphery is positively biassed towards said sealing contact with the seat of the valve assembly but the rate of increase of resistance to gas flow in the permitted direction lessens above a predetermined value of flow, said outlet comprising a speech transmitter with a sound passage therethrough, said sound passage having an inner upstream end and an outer downstream end relative to the permitted direction of flow of gas outwardly from the facepiece, the said outlet valve assembly being in said sound passage with said disc of elastomeric material across the passage, the passage comprising wall means defining a convolute portion of the passage of cross-section increasing progressively in the downstream direction of permitted flow and having at least two substantial reversals of direction, and defining a further portion of the passage which is progressively convergent in the downstream direction of permitted flow, said convolute portion of the passage being downstream of the progressively convergent portion relative to the direction of permitted flow.

2. A respirator as claimed in claim 1 wherein each of the valve assemblies comprises a said valve member, the said valve members both being arranged with the said channel opening towards the outside of the respirator.

3. A respirator as claimed in claim 2 wherein each valve member is an integral one-piece whole of elastomeric material, said conicity being concave towards the valve-closing condition of the periphery and said annular channel being of substantially semi-toroidal section.

4. A respirator as claimed in claim 1 wherein each of the valve assemblies comprises a said valve member, the said valve member of the inlet valve assembly being arranged with the said channel opening towards the inside of the respirator and the said valve member of the outlet valve being arranged with the said channel opening towards the outside of the respirator.

5. A respirator as claimed in claim 4 wherein each valve member is an integral one-piece whole of elastomeric material, said conicity being concave towards the valve-closing condition of the periphery and said annular channel being of substantially semi-toroidal section.

6. a respirator as claimed in claim 1 wherein the valve member comprises an elastomeric stem as said securing means, said stem comprising successively a narrow portion adjacent said central portion of the disc, a shoulder, and an outwardly conical portion thereafter diminishing from said shoulder, whereby securing is achieved by stretching the conical portion through an orifice in the valve assembly which is undersize for the shoulder until the orifice is around the narrow portion.

7. A respirator as claimed in claim 6 wherein said securing pretensions said periphery against said seat.

8. A respirator as claimed in claim 1 wherein said valve member has a rear surface in the direction of closing and a front surface away from the direction of closing and is dished in said conicity from the outer edge of the channel to the periphery of the disc, said dishing being such that the periphery of the disc in the relaxed condition thereof lies substantially rearwardly beyond the plane of the rear surface of the central portion of the disc.

9. A respirator as claimed in claim 8 wherein the said rear surface of the central portion of the disc terminates at the radially inner edge of the said annular channel, the radially outer edge of the channel being in a plane forwardly of that of the said rear surface.

10. A respirator as claimed in claim 8 wherein the front surface of the central portion of the disc terminates at the radially inner edge of the annular channel, the radially outer edge thereof being in a plane which is forwardly of that of the front surface.

11. A respirator as claimed in claim 1 wherein the securing means is an elastomeric stem integral with the disc, the disc having a rear surface in the direction of closing and a front surface away from the direction of closing and being dished in said continuous conicity from the outer edge of the channel to the periphery of the disc, said dishing being such that the periphery of the disc in the relaxed condition thereof lies substantially rearwardly beyond the plane of the rear surface of the central portion of the disc, the front surface of the central portion of the disc terminating at the radially inner edge of the annular channel, the radially outer edge thereof being in a plane which is forwardly of that of the front surface.

12. A respirator as claimed in claim 1 wherein said valve member is arranged with the said channel opening toward the outside of the respirator.

13. A respirator as claimed in claim 1 wherein each of the valve assemblies comprises a said valve member, and at least one of the valve members is arranged with its channel opening toward the outside of the respirator.

14. A respirator as claimed in claim 1 wherein each of the valve assemblies comprises a said valve member, and at least one of the valve members is arranged with its channel opening toward the inside of the respirator.

15. A respirator as claimed in claim 1 wherein each of the valve assemblies comprises a said valve member, and one of the valve members is arranged with its channel opening toward the outside of the respirator, and the other of the valve members is arranged with its channel opening toward the inside of the respirator.

* * * * *